(12) United States Patent  (10) Patent No.: US 7,497,290 B2
Marsala et al.  (45) Date of Patent: Mar. 3, 2009

(54) FUEL TANK SHIELD WITH CUSHION

(75) Inventors: Vincent J. Marsala, Auburn Hills, MI (US); Philip A. Yaccarino, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 406 days.

(21) Appl. No.: 11/459,033

(22) Filed: Jul. 21, 2006

(65) Prior Publication Data

US 2008/0017430 A1 Jan. 24, 2008

(51) Int. Cl.
*B60P 3/22* (2006.01)

(52) U.S. Cl. ............... 180/69.1; 180/69.4; 280/830; 220/562

(58) Field of Classification Search ........... 280/784, 280/830, 832, 834; 180/69.4, 69.5, 69.1; 220/562

See application file for complete search history.

(56) References Cited

U.S. PATENT DOCUMENTS

| 4,909,530 | A | * | 3/1990 | Tsukada et al. | 180/296 |
| 5,201,547 | A | * | 4/1993 | Ogawa et al. | 280/834 |
| 6,102,807 | A | * | 8/2000 | Barrett et al. | 464/180 |
| 6,401,961 | B1 | * | 6/2002 | Butler | 220/562 |
| 6,481,751 | B1 | * | 11/2002 | Davis et al. | 280/831 |
| 6,886,861 | B2 | * | 5/2005 | Marsala et al. | 280/834 |

* cited by examiner

*Primary Examiner*—Christopher P Ellis
*Assistant Examiner*—Brian Swenson

(57) ABSTRACT

A fuel tank shield is provided for mounting between a fuel tank and a rotating drive shaft of the type having a generally smooth cylindrical outer surface from which a hard edge extends adjacent the fuel tank shield. A recess is provided in the fuel tank shield and a block of cushion material is mounted in the recess to fill the recess. In an event that would cause the rotating drive shield to encroach into the space normally occupied by the fuel tank shield, the cushion material will be subjected to wearing away by the contact of the hard edge of the rotating drive shaft so that the hard edge becomes absorbed within the pocket formed by wearing away of a portion of the cushion material.

19 Claims, 3 Drawing Sheets

FUEL TANK SHIELD WITH CUSHION

FIELD OF THE INVENTION

The present invention relates to a shield mounted between a fuel tank and a rotating drive shaft, and more particularly to the provision of a cushion carried by the fuel tank shield to be worn into a custom fitting cushion shape in event of contact with a hard edge of the rotating drive shaft.

BACKGROUND OF THE INVENTION

It is known in motor vehicles to mount a fuel tank generally within the space between the underside of the vehicle body and a rotating drive shaft that powers the rear wheels. A fuel tank shield is positioned just beneath the fuel tank and above the rotating drive shaft in order to shield the underside of the fuel tank from objects that might be kicked up from the highway. And, because the rotating drive shaft can have hard edges such a universal joint or a balance weight, it is common for the fuel tank shield, and also the fuel tank, to have a recessed wall portion that provides additional clearance in the region of the hard edge of the rotating drive shaft.

It would be desirable to provide alternate constructions in the design of fuel tank shields.

SUMMARY OF THE INVENTION

A fuel tank shield is provided for mounting between a fuel tank and a rotating drive shaft of the type having a generally smooth cylindrical outer surface from which a hard edge extends. A recess is provided in the fuel tank shield and a block of cushioning material is mounted in the recess to fill the recess. In the event that the rotating drive shaft encroaches into the space normally occupied by the fuel tank shield, that part of the cushioning material contacted by the hard edge of the rotating shaft will be subjected to wearing away so that the hard edge becomes absorbed within a pocket formed by the wearing away of the cushioning material, while the remaining cushion material within the recess continues to closely fit the shape of the hard edge.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
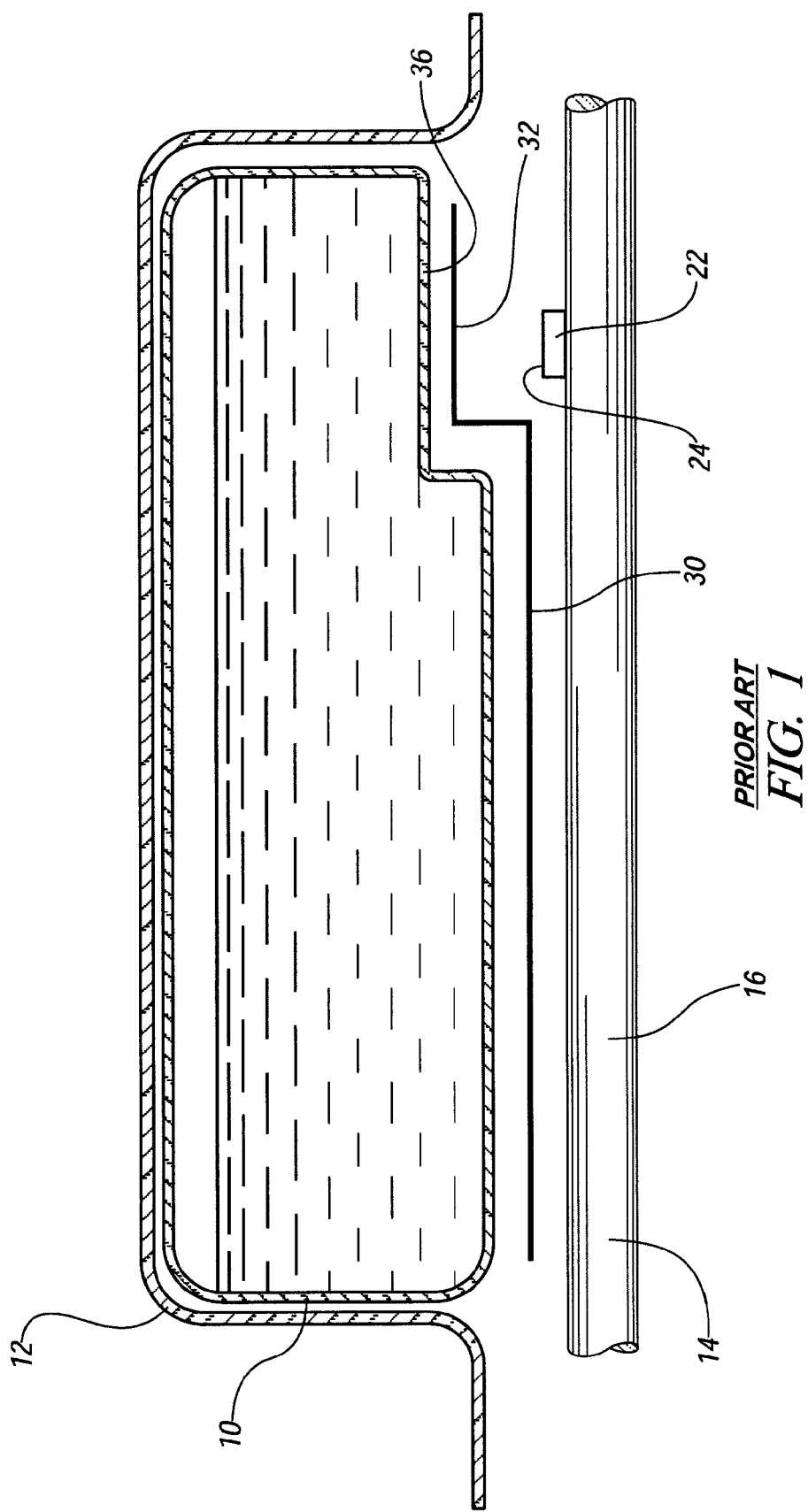
FIG. 1 is a longitudinal section view taken through a vehicle and showing a fuel tank, fuel tank shield, and rotating drive shaft.

Referring to FIG. 1, a prior art vehicle is shown in which a fuel tank 10 is mounted beneath the floor panel 12, by mounting straps, not shown. A rotating drive shaft 14 is situated beneath the floor panel 12 and the fuel tank 10 and extends between the engine and transmission, not shown, to the rear axle, not shown, to drive the rear wheels of the vehicle.

The rotating drive shaft 14 is cylindrical in shape and has a smooth outer surface 16. FIG. 1 shows a balance weight 22 that is welded onto the outer surface 16 in order to balance the rotating drive shaft 14 for high speed rotation. Thus, the balance weight 22 presents a hard edge 24 that extends from the smooth outer surface 16 of the rotating drive shaft 14.

The fuel tank is protected from beneath by a fuel tank shield 30 that is a generally planar metal stamped panel or molded plastic panel. The fuel tank shield 30 is suitably mounted on the vehicle in a way that it is suspended in spaced relationship from the underside of the fuel tank 10 and provides a barrier to any object approaching the underside of the fuel tank 10. The fuel tank shield 30 has an upwardly recessed portion 32 that registers with the balance weight 22. The fuel tank 10 has an upwardly recessed portion 36 that maintains the desired spaced relationship between the fuel tank 10 and the upwardly recessed portion 32 of the fuel tank shield 30.

During the normal operation of the vehicle, the balance weight 22 and its hard edge 24 will rotate at high speed and remain clear of any contact with the fuel tank shield 30 due to the clearance space between fuel tank shield 30 and the balance weight 22. In the event of the rotating drive shaft 14 approaching closer to the fuel tank shield 30 than normal, the balance weight 22 and its hard edge 24 will rotate at high speed and remain clear of any contact with the fuel tank shield 30 due to the upwardly recessed portion 32 that overlies the balance weight 22.

Figure 2:
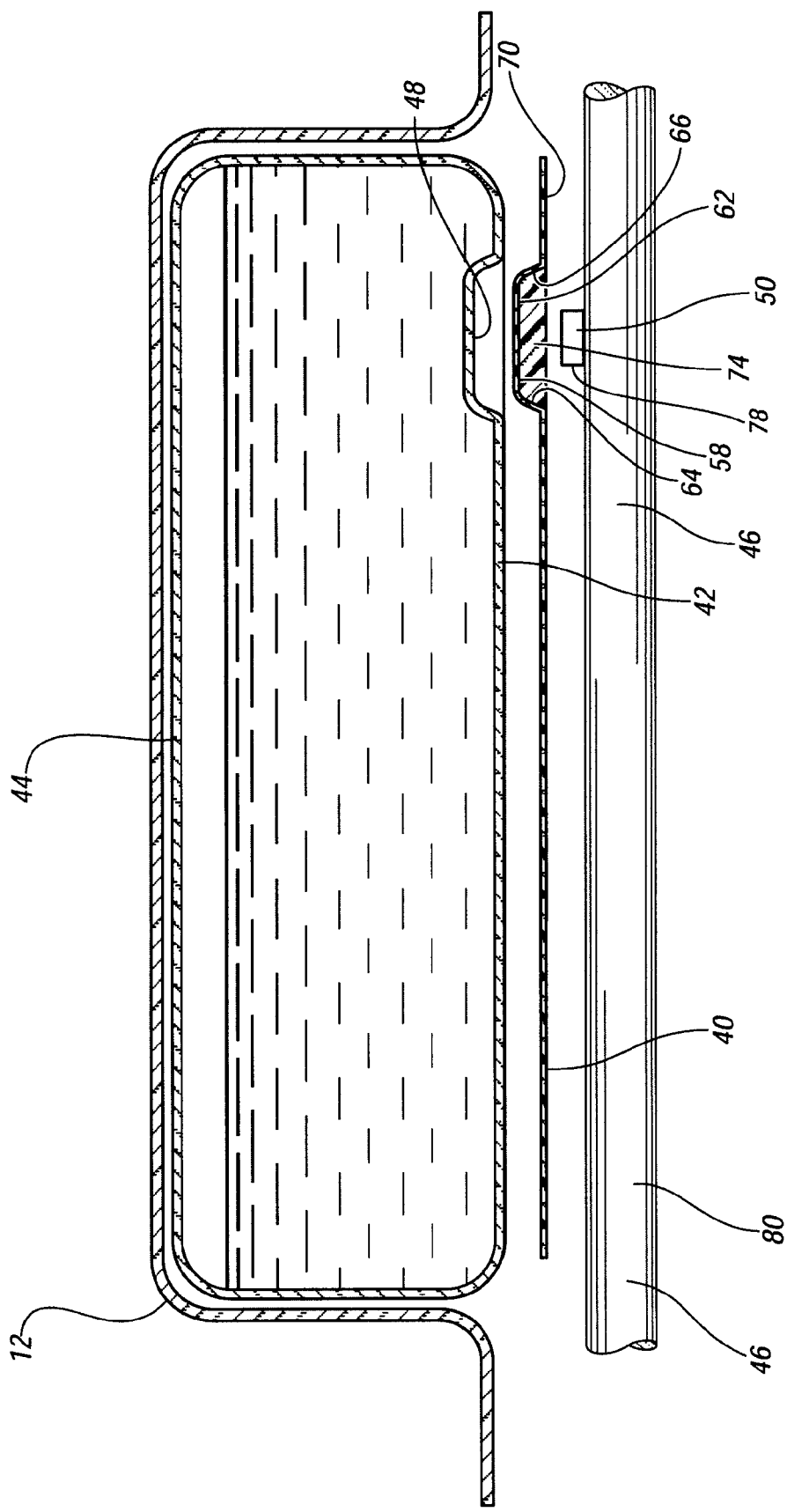
FIG. 2 is a longitudinal section view taken through a vehicle and showing the new and improved fuel tank shield arrangement.

Referring to FIG. 2, a fuel tank shield 40 is provided and suitably mounted on the vehicle underbody between the underside wall 42 of the fuel tank 44 and the rotating drive shaft 46. The underside wall 42 of the fuel tank 44 has a recess 48 formed therein. A balance weight 50 is welded to the rotating drive shaft 46. The fuel tank shield 40 is of plastic or sheet metal construction and has a recess 58 including a top wall portion 62, a forward wall portion 64 and a rearward wall portion 66. The fuel tank shield 50 includes a rearward most lip portion 70 that extends rearwardly from the rearward wall portion 66 of the recess 58. The recess 58 of the fuel tank shield 60 is filled with a cushion 74. The cushion 74 is a block of metal, polymer or other material that is cast or riveted or otherwise attached to the fuel tank shield 60 and fills the recess 58.

Figure 3:
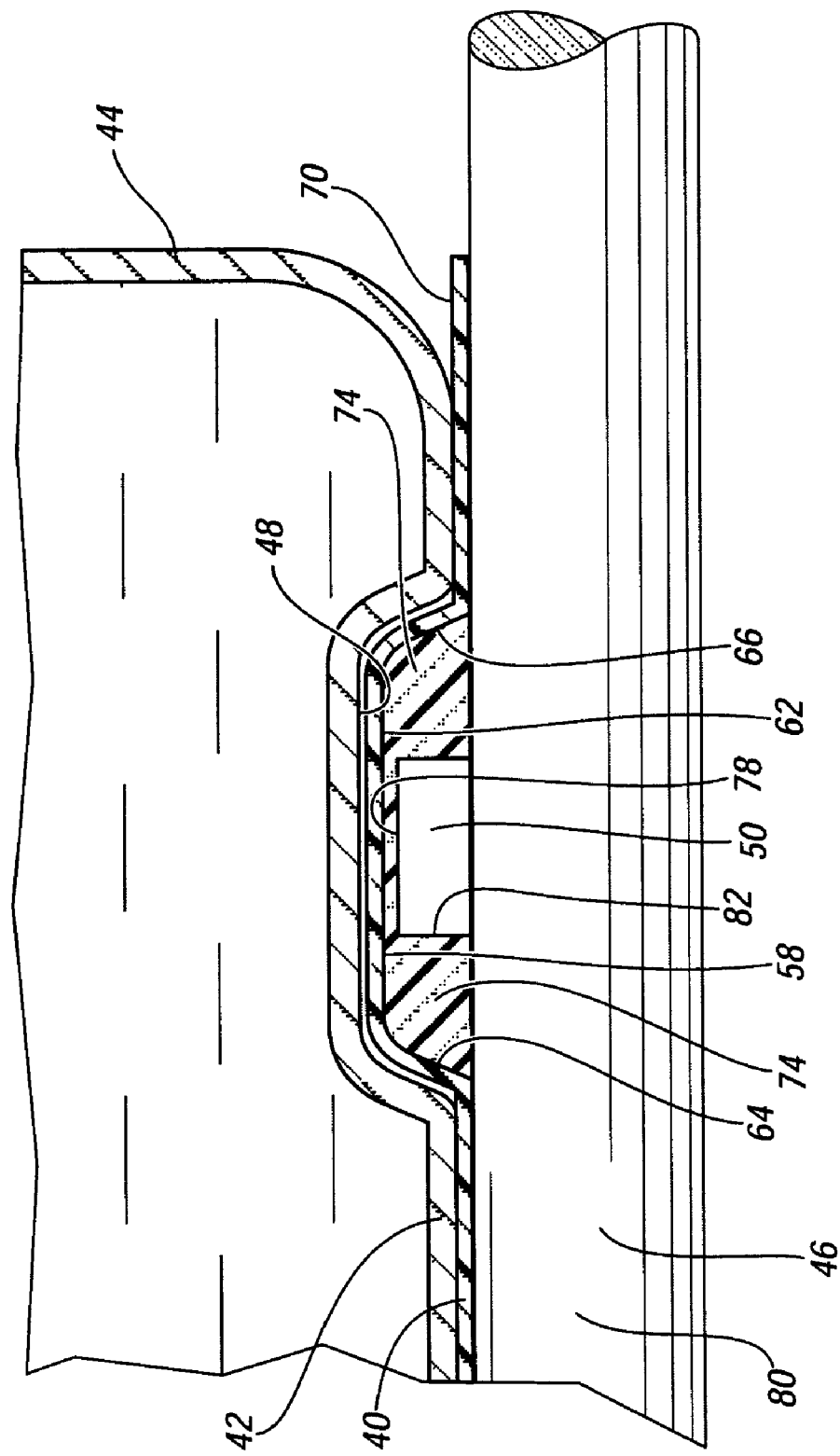
FIG. 3 is a view similar to FIG. 1 but showing the operation of the shield cushion upon the occurrence of contact of the fuel tank shield with the rotating drive shaft.

During the normal operation of the vehicle, the balance weight 50 and its hard edge 78 will rotate at high speed and remain clear of any contact with the fuel tank shield 30 due to the clearance space that normally exists between the balance weight 50 and the cushion 74. However, as seen in FIG. 3, in the event of the rotating drive shaft 46 approaching closer to the fuel tank shield 30 than normal, the balance weight 50 and its hard edge 78 rotating at high speed will wear into the cushion 74 and form a pocket 82 in the cushion 74 that matches the exact shape of the balance weight 50. The depth of the recess 58, as determined by the height of the forward wall portion 64 and the rearward wall portion 66 of the tank shield 30 is such that the cushion 74 will absorb the entire height of the balance weight 50 without allowing the balance weight 50 to come into contact with the top wall portion 62 of the recess 58. In addition, the length and width of the recess 58 is sized to exceed the dimension of maximum potential encroachment of the balance weight 50. Once the balance weight 50 is fully absorbed within the cushion 74, as seen in FIG. 3, the smooth outer surface 80 of the rotating drive shaft 46 will be contacting with the planar surface of the fuel tank shield 40, including the rearward extending lip portion 70, so that any further encroachment of the rotating drive shaft 80 into the fuel tank shield 50 will be spread over a substantial length of the fuel tank shield 50 while the presence of the balance weight 50 continues to be taken within the pocket 82 that the balance weight 50 has carved into the cushion 74. The balance weight 50 is thus encapsulated within the custom formed pocket 82 of the cushion 74 and the remaining undisturbed portion of the cushion 74 acts as a close fitting cushion to surround the balance weight 50 and its hard edge 78 from any effect on the fuel tank shield 40 and fuel tank 44.

The foregoing description of the invention is merely exemplary in nature and, thus, variations thereof are intended to be within the scope of the invention. For example, the improved fuel tank shield 50 can be advantageously used in vehicles where the hard edge presented by the rotating drive shaft may be a drive shaft connector, a drive shaft universal joint, or some other structure of the rotating drive shaft. Furthermore, the improved fuel tank shield can be used whether the rotating drive shaft is a drive shaft extending longitudinally of the vehicle or laterally of the vehicle.

What is claimed is:

1. A fuel tank shield for mounting between a fuel tank and a drive shaft of the type having a generally smooth cylindrical outer surface from which a hard edge extends adjacent the fuel tank shield, comprising:
    a recess formed in the fuel tank shield; and
    a block of cushion material filling the recess and being subjected to wearing away in the event of contact therewith by the hard edge of the drive shaft.

2. The fuel tank shield of claim 1 in which the recess formed in the fuel tank has a depth greater than the extent to which the hard edge of the drive shaft extends from the generally smooth surface of the drive shaft.

3. The fuel tank shield of claim 1 in which the block of cushion material has a depth greater than the extent to which the hard edge of the drive shaft extends from the generally smooth surface of the drive shaft.

4. The fuel tank shield of claim 1 in which the recess formed in the fuel tank shield and the block of cushion material are each of greater dimension than the extent of the potential encroachment of the hard edge of the drive shaft into the block of cushion material so that upon a wearing away of cushion material by the hard edge a remaining portion of the cushion material will closely encapsulate the hard edge of the drive shaft to maintain a spaced relationship between the hard edge and the fuel tank shield.

5. The fuel tank shield of claim 1 in which the hard edge of the drive shaft is a balance weight carried by the drive shaft.

6. The fuel tank shield of claim 1 in which the cushion material is metal.

7. The fuel tank shield of claim 1 in which the cushion material is a polymer material.

8. The fuel tank shield of claim 1 in which the fuel tank shield has a rearward extending lip portion that extends rearwardly from the recess formed in the fuel tank shield.

9. A fuel tank shield for mounting between a fuel tank and a rotating drive shaft of the type having a generally smooth cylindrical outer surface from which a hard edge extends adjacent the fuel tank shield, comprising:
    a recess formed in the fuel tank shield, said recess being of greater dimension than the extent of the potential encroachment between the hard edge of the rotating drive shaft and the fuel tank shield; and
    a block of cushion material filling the recess and being subjected to wearing away in the event of contact therewith by the hard edge of the rotating drive shaft whereby a pocket is formed within cushion material to receive the hard edge and the portion of the cushion not worn away forms a closefitting cushion surrounding the hard edge.

10. The fuel tank shield of claim 9 in which the block of cushion material has a depth greater than the extent to which the hard edge of the rotating drive shaft extends from the generally smooth surface of the rotating drive shaft.

11. The fuel tank shield of claim 9 in which the hard edge of the rotating drive shaft is a balance weight carried by the rotating drive shaft.

12. The fuel tank shield of claim 9 in which the cushion material is metal.

13. The fuel tank shield of claim 9 in which the cushion material is a polymer material.

14. The fuel tank shield of claim 9 in which the fuel tank shield has a generally planar portion overlying the drive shaft and a rearward extending lip portion that extends rearwardly from the recess formed in the fuel tank shield so that upon encroachment between the drive shaft and the fuel tank shield the smooth outer surface of the drive shaft bears upon the planar portion and the rearward extending lip portion to prevent further encroachment there between.

15. A fuel tank shield having a generally planar surface for mounting between a fuel tank and a rotating drive shaft of the type having a generally smooth cylindrical outer surface from which a hard edge extends adjacent the fuel tank shield, comprising:
    a recess formed in the fuel tank shield, said recess being of greater size than the extent of potential encroachment between the hard edge of the rotating drive shaft and the fuel tank shield; and
    a block of cushion material mounted on the fuel tank shield and filling the recess, said cushion material being partially worn away by contact with the hard edge of the rotating drive shaft whereby a pocket is formed within cushion material to receive the hard edge and the portion of the cushion not worn away forms a closefitting cushion surrounding the hard edge, said extent of potential encroachment being limited by the engagement of the smooth outer surface of the rotating drive shaft with the generally planar surface of the fuel tank shield.

16. The fuel tank shield of claim 15 in which the hard edge of the rotating drive shaft is a balance weight carried by the rotating drive shaft.

17. The fuel tank shield of claim 15 in which the cushion material is metal.

18. The fuel tank shield of claim 15 in which the cushion material is a polymer material.

19. The fuel tank shield of claim 15 in which the fuel tank shield has a rearward extending lip portion that extends rearwardly from the recess formed in the fuel tank shield and said extent of potential encroachment being limited by the engagement of the smooth outer surface of the rotating drive shaft with the rearward extending lip portion.

\* \* \* \* \*